(12) United States Patent
Foster et al.

(10) Patent No.: US 7,105,350 B2
(45) Date of Patent: *Sep. 12, 2006

(54) CLOSURE INTEGRITY TEST METHOD FOR HOT-FILL BOTTLING OPERATION

(75) Inventors: Tammy Foster, Sarasota, FL (US); Tammy Svoboda, Bradenton, FL (US)

(73) Assignee: Tropicana Products, Inc., Bradenton, FL (US)

( * ) Notice: Subject to any disclaimer, the term of this patent is extended or adjusted under 35 U.S.C. 154(b) by 494 days.

This patent is subject to a terminal disclaimer.

(21) Appl. No.: 10/233,170

(22) Filed: Aug. 30, 2002

(65) Prior Publication Data

US 2004/0043492 A1    Mar. 4, 2004

(51) Int. Cl.
*G01N 31/00* (2006.01)

(52) U.S. Cl. .................. 436/1; 436/2; 436/3; 436/5; 436/164; 436/166; 436/172; 750/302; 750/458.1

(58) Field of Classification Search .................. 436/2, 436/3, 5, 164, 166, 172, 1
See application file for complete search history.

(56) References Cited

U.S. PATENT DOCUMENTS

| | | | |
|---|---|---|---|
| 1,584,022 A | 5/1926 | Englund |
| 2,127,548 A | 8/1938 | Boyle et al. |
| 2,254,609 A | 9/1941 | Kinzer |
| 2,416,619 A | 2/1947 | Fleisher |
| 2,472,522 A | 6/1949 | Taber |
| 2,479,743 A | 8/1949 | Hall et al. |
| 2,772,522 A | 12/1956 | Minami |
| 3,190,724 A | 6/1965 | Compton et al. |
| 3,386,920 A | 6/1968 | Alburger |
| 3,422,670 A | 1/1969 | Alburger |
| 3,558,505 A | 1/1971 | Mlot-Fijalkowski |
| 3,627,469 A | 12/1971 | Cheng |
| 3,676,007 A | 7/1972 | Kiess |
| 3,748,469 A | 7/1973 | Molina |
| 3,803,051 A | 4/1974 | Molina |
| 3,912,653 A | 10/1975 | Alburger |
| 4,273,671 A | 6/1981 | Allinikov |
| 4,300,689 A | 11/1981 | Franklin et al. |
| 4,331,871 A | 5/1982 | Allinikov |
| 4,382,679 A | 5/1983 | Lee |
| 4,392,982 A | 7/1983 | Molina |
| 4,407,842 A | 10/1983 | Shepard |
| 4,407,960 A | 10/1983 | Tratnyek |
| 4,448,548 A | 5/1984 | Foley |
| 4,641,518 A | 2/1987 | Hutchings |
| 4,678,658 A | 7/1987 | Casey et al. |
| 4,743,398 A | 5/1988 | Brown et al. |
| 4,756,854 A | 7/1988 | Wegrzyn |
| 4,830,192 A | 5/1989 | Plester et al. |
| 4,847,066 A | 7/1989 | Honigs et al. |
| 4,858,465 A | 8/1989 | Molina |
| 4,863,627 A | 9/1989 | Davies et al. |
| 5,057,303 A | 10/1991 | Casey |
| 5,067,616 A | 11/1991 | Plester et al. |
| 5,110,492 A | 5/1992 | Casey |
| 5,123,261 A | 6/1992 | Cope |
| RE34,515 E | 1/1994 | Foley |
| 5,416,323 A | 5/1995 | Hoots et al. |
| 5,578,240 A | 11/1996 | Park et al. |
| 5,658,798 A | 8/1997 | Bertin et al. |
| 5,670,469 A | 9/1997 | Dingus et al. |
| 5,703,024 A | 12/1997 | Park et al. |
| 5,832,697 A | 11/1998 | Rogers |
| 5,900,067 A | 5/1999 | Jones |
| 5,955,025 A | 9/1999 | Barrett |
| 6,087,179 A | 7/2000 | Beriozkina et al. |
| 6,135,015 A | 10/2000 | Mendez |
| 6,737,645 B1 * | 5/2004 | Foster et al. ........... 250/302 |

FOREIGN PATENT DOCUMENTS

| | | |
|---|---|---|
| EP | 0 566 500 A2 | 4/1993 |
| EP | 0 762 100 A1 | 9/1996 |
| JP | 01284728 | 11/1989 |
| WO | WO 01/28865 A1 | 4/2001 |

OTHER PUBLICATIONS

PCT International Search Report.

* cited by examiner

*Primary Examiner*—Jill Warden
*Assistant Examiner*—Sam P. Siefke
(74) *Attorney, Agent, or Firm*—Lars S. Johnson; James D. Ryndak

(57) ABSTRACT

A method for evaluating the integrity of the closure on a hot-filled container in which the hot-filled container is subjected to a pressurized spray of cooling medium, including the step of providing a cooling medium having an effective amount of a fluorescing dye contained therein, is provided. The sealed container then is sprayed with the cooling liquid. After the container has exited the cooling portion of the filling and sealing operation, the container is subjected to ultraviolet light to activate any fluorescing dye which may have migrated past the closure into the interior of the container. The container is then viewed to determine the presence or absence of activated dye.

16 Claims, No Drawings

CLOSURE INTEGRITY TEST METHOD FOR HOT-FILL BOTTLING OPERATION

BACKGROUND OF THE INVENTION

A wide variety of food and beverage products are packaged in sealed containers in a hot-filling operation in which the food or beverage is heated to a temperature typically above 170° F. (77° C.), and as high as 200° F. (93° C.), in order to achieve shelf stability. After hot-filling and sealing, the sealed containers must be cooled as quickly as possible in order to both minimize any bacterial growth inside the package and to maximize the product's shelf life.

Several methods are used for cooling the hot-filled containers, including conveying the sealed hot-filled containers through a cooling tunnel where they are sprayed with a cooling medium to cool the containers to a temperature typically less than 50° F. (10° C.). When a pressurized spray is used to cool the hot-filled containers, it is important to be sure that the closure for the container is effective in preventing the pressurized spray from migrating past the closure and into the interior of the container. Such migrating cooling medium might contaminate the container's contents, and also indicates that other substances may be capable of entering the container through the closure.

Accordingly, it is an object of the present invention to provide a method for evaluating the integrity of a closure for a hot-filled container that is subjected to a pressurized cooling spray.

It is a further object of the present invention to provide such a method that does not necessarily require that the integrity of the closure be breached to determine whether the closure effectively seals the container.

SUMMARY OF THE INVENTION

These objects, and others which will become apparent upon reference to the following detailed description, are provided by a method for evaluating the integrity of the closure on a hot-filled container in which the hot-filled container is subjected to a pressurized spray of cooling liquid, including the step of providing a cooling liquid having an effective amount of a fluorescing dye contained therein. The sealed container then is sprayed with the cooling liquid. After the container has exited the cooling portion of the filling and sealing operation, the container is subjected to ultraviolet light to activate any fluorescing dye which may have migrated past the closure into the interior of the container. The container then is viewed to determine the presence or absence of activated dye.

Preferably, the cooling liquid with the fluorescing dye is sprayed onto the container during the first portion of the cooling zone. The subsequent portions of the cooling zone use a cooling liquid without such dye so that any fluorescing dye on the exterior of the container can be washed off and only the fluorescing dye that migrates past the closure will be detected when the container is exposed to ultraviolet light. A preferred fluorescing solution comprises riboflavin, and water, with approximately 0.2 gram of riboflavin for each liter of water being typical concentrations.

The ultraviolet light can be shined through the side walls of the container if the container is translucent, that is, a container that allows light to be transmitted therethrough, and any dye that has migrated into the contents of the container will be activated upon being subjected to the ultraviolet light. Alternatively, the closure can be removed from the container and the area of the container exposed by the removed closure can be subjected to ultraviolet light to activate any fluorescing dye that may have migrated up past the closure.

DETAILED DESCRIPTION

Hot-fill and seal operations are well known in the food packaging art and, consequently, are not discussed in detail herein. A sub-system commonly forming a part of such an operation is a cooling tunnel in which the hot-filled containers are subjected to a refrigerated cooling spray in order to rapidly reduce their temperature.

In a cooling tunnel, the hot-filled containers are typically subjected to a cooling spray throughout the time they are conveyed through the cooling tunnel, and the length of the tunnel is dependent upon various factors, such as the speed at which the containers are conveyed through the cooling zone and the rate of the volume of liquid sprayed. Time requirements can depend upon the size of the container, the volume of its contents, the make-up of the container, its shape, and the hot-fill temperature.

In keeping with the invention, a method is provided for evaluating the integrity of a closure applied to a hot-filled container in a hot-fill operation that uses a cooling spray of pressurized liquid. In general, the cooling spray of the invention includes a fluorescing solution or dye which is sprayed onto the exterior of the container as it passes through the cooling tunnel. The cooling medium that contains the dye is rinsed from the exterior of the container, and the container then is subjected to ultraviolet light. If the ultraviolet light activates any fluorescing dye that has migrated to the interior of the container, it is confirmed that the closure did not effectively seal the container. Conversely, if exposure to the ultraviolet light does not activate any fluorescing dye, it can reasonably be assumed that the closure effectively sealed the container.

The fluorescing dye solution is preferably added to the reservoir for the cooling sprayers in the first section of the cooling tunnel in an amount that is effective to result in the activated dye being visible to the unaided eye if any cooling liquid containing the dye migrates to the interior of the container. The spray from the subsequent sections of the cooling tunnel, which does not contain any fluorescing dye, serves to rinse off any fluorescing dye from the exterior of the container.

A preferred fluorescing dye is made from riboflavin, which is Vitamin $B_{12}$, suitable for use in food and beverage products. The riboflavin is extremely sensitive to light and has an intense greenish yellow fluorescence when exposed to UV light. The riboflavin is added to water. It is possible to include an adhesion promoter such as a sugar. For example, sucrose can be added to provide for adhesion. Other adhesion providers, including other sugars, can be used instead of all or a part of the sucrose.

Riboflavin typically is added at between about 0.1 and about 1.0 gram per liter of water. When included, a sugar such as sucrose is added at a level of between about 50 and about 150 grams per liter of water. When a sugar is included, the weight ratio of sugar to riboflavin is between about 1000:1 and 100:1.

An example of a formula for a fluorescing dye for use in the present invention is set forth in Table I.

TABLE I

| FLUORESCING DYE | |
|---|---|
| WATER | 1 LITER |
| RIBOFLAVIN | 0.2 GRAM |

The riboflavin may be a commercially-available reagent grade product, such as Eastman Kodak #EK1177112 riboflavin orange powder, or an equivalent. The water may be plant or process water. If a sugar is included in a formulation such as in Table I, an example would be to add 100 grams of sucrose to that formulation.

If the container is made of a translucent material such that it transmits UV light through its side walls, the test to determine whether any fluorescing dye has migrated past the closure may be done by directly shining the UV light through the sidewalls of a container, without opening the closure or otherwise breaching the integrity of the sealed container. This allows for on-line testing of containers being filled, as desired. If the fluorescing dye has contaminated any of the contents of the container it should be activated upon being exposed to the UV light. This provides an indicator of a defect in that filled container and product.

Alternatively, the closure can be removed from the container and UV light shined on the area of the container exposed by the removed closure to determine whether any of the cooling spray has migrated up to the closure area.

In practice, a long-wave ultraviolet lamp is used. However, other light sources well known in the art may also be used as long as they are effective in activating the fluorescing dye or otherwise provide a signal which is detectible by the human eye or equipment designed for such detection.

Thus, a method for evaluating the integrity of a closure on a hot-filled container has been provided that meets all the objects of the present invention. Although the invention has been described in terms of a preferred embodiment, there is no intent to limit it to the same. Instead, the invention is defined in accordance with the scope of the following claims.

What is claimed:

1. A method for evaluating the integrity of a closure on a hot-filled light transmissive container having an interior and an exterior and wherein the hot-filled light transmissive container is subjected to a pressurized spray of a cooling medium, comprising:
   providing the cooling medium with an effective amount of a fluorescing dye composition having a fluorescing agent;
   spraying the hot-filled light transmissive container with the cooling medium having the fluorescing dye composition;
   rinsing the exterior of the hot-filled light transmissive container to remove substantially all fluorescing agent therefrom;
   subjecting the hot-filled light transmissive container to ultraviolet light to activate any fluorescing agent that may have migrated past the closure to the interior of the hot-filled light transmissive container; and
   viewing the hot-filled light transmissive container to determine the presence or absence of activated fluorescing agent.

2. The method of claim 1 wherein the fluorescing agent comprises riboflavin and water.

3. The method of claim 2 wherein said riboflavin is present at between about 0.1 and about 1.0 gram for each liter of water of the fluorescing dye composition.

4. The method of claim 2 wherein the fluorescing dye composition also includes an adhesion promoting agent.

5. The method of claim 4 wherein said adhesion promoting agent is a sugar present at between about 50 and about 150 grams for each liter of water of the fluorescing dye composition.

6. The method of claim 4 wherein said adhesion promoting agent and riboflavin are present at a weight ratio of between about 100:1 and about 1000:1.

7. The method of claim 1 wherein the fluorescing dye composition comprises approximately 0.2 gram riboflavin for each liter of water.

8. The method of claim 1 wherein the container comprises translucent sidewalls which allow light to be transmitted therethrough and the ultraviolet light is transmitted through the sidewalls of the container to activate any fluorescing agent that may have migrated past the closure to the interior of the container.

9. The method of claim 1 wherein the closure is removed from the container to expose an area previously covered by the closure, and the exposed area of the container is subjected to ultraviolet light to activate any fluorescing agent that may have migrated into the exposed area.

10. The method of claim 1 wherein the ultraviolet light is provided by a long-wave ultraviolet lamp.

11. A method for evaluating the integrity of a closure on a hot-filled light transmissive container having an interior and an exterior and wherein the hot-filled light transmissive container is subjected to a pressurized spray of a cooling medium, comprising:
   providing the cooling medium with an effective amount of a fluorescing dye composition having a fluorescing agent;
   spraying the hot-filled light transmissive container with the cooling medium having the fluorescing dye composition while also cooling the hot-filled light transmissive container with a pressurized spray of the cooling medium;
   subjecting the hot-filled light transmissive container to ultraviolet light to activate any fluorescing agent that may have migrated past the closure to the interior of the hot-filled light transmissive container; and
   viewing the hot-filled light transmissive container to determine the presence or absence of activated fluorescing agent.

12. The method of claim 11 wherein the fluorescing dye composition comprises riboflavin and water.

13. The method of claim 12 wherein the fluorescing dye composition comprises approximately 0.2 gram of riboflavin for each liter of water.

14. The method of claim 11 wherein said hot-filled light transmissive container has translucent sidewalls and the ultraviolet light is transmitted through the sidewalls of the hot-filled light transmissive container to activate any fluorescing agent that may have migrated past the closure to the interior of the hot-filled light transmissive container.

15. The method of claim 11 wherein the closure is removed from the hot-filled light transmissive container to expose an area previously covered by the closure, and the exposed area of the hot-filled light transmissive container is subjected to ultraviolet light to activate any fluorescing agent that may have migrated into the exposed area.

16. The method of claim 11 wherein the fluorescing dye composition comprises riboflavin, a sugar and water.

* * * * *